United States Patent [19]

Charbonnet

[11] Patent Number: 5,209,881
[45] Date of Patent: May 11, 1993

[54] HIGH ACCURACY CONTROL SYSTEM AND METHOD FOR PANEL LINE PRODUCTION

[75] Inventor: Derrick Charbonnet, Arlington, Tex.

[73] Assignee: W.R. Grace & Co.-Conn., New York, N.Y.

[21] Appl. No.: 802,959

[22] Filed: Dec. 5, 1991

[51] Int. Cl.⁵ .............................................. B29C 35/10
[52] U.S. Cl. ....................................... 264/25; 156/199; 156/351; 264/40.2; 264/40.6; 264/40.7; 264/258; 264/324; 264/286; 364/473; 425/143; 425/145; 425/162; 425/174.4
[58] Field of Search ................... 264/40.1, 25, 40.6, 264/22, 40.7, 258, 324, 40.02, 286, 236, 347; 425/143, 145, DIG. 108, 174.4, 162, 445; 364/473; 156/199, 351

[56] References Cited

U.S. PATENT DOCUMENTS

| | | |
|---|---|---|
| 3,596,071 | 7/1971 | Doering . |
| 3,722,462 | 3/1973 | Pohler et al. . |
| 3,762,896 | 10/1973 | Borst . |
| 3,845,287 | 10/1974 | Fremont et al. . |
| 3,852,141 | 12/1974 | Cross . |
| 3,989,934 | 11/1976 | Fay . |
| 3,989,937 | 11/1976 | Fay et al. . |
| 4,132,518 | 1/1979 | Rips ........................................ 425/143 |
| 4,186,220 | 1/1980 | Chiron . |
| 4,246,298 | 1/1981 | Guarnery et al. . |
| 4,246,315 | 1/1981 | Kopp et al. . |
| 4,271,106 | 6/1981 | Groleau ............................. 264/40.6 |
| 4,329,194 | 5/1982 | Green et al. ......................... 264/258 |
| 4,504,343 | 3/1985 | Green ................................... 156/205 |
| 4,626,309 | 2/1986 | Lempfer et al. ..................... 264/40.7 |
| 4,717,598 | 1/1988 | Suzuki . |
| 4,810,438 | 3/1989 | Webster et al. ...................... 264/40.6 |
| 5,098,496 | 3/1992 | Breitigam et al. ................... 264/40.7 |

*Primary Examiner*—Jeffery Thurlow
*Assistant Examiner*—Mathieu Vargot
*Attorney, Agent, or Firm*—Craig K. Leon; William L. Baker

[57] ABSTRACT

The invention provides a control system and method for curing composite articles such as corrugated fiberglass resin plastic (FRP) panels. An exemplary system of the invention includes a curing oven, at least one infrared pyrometer sensor which is located within the oven curing zone and which provides an output indicating the temperature of the resin being cured, a tractor unit for moving the panel through the oven, and a comparator circuit which adjusts the speed of the tractor unit in predetermined response to sensor output. The invention thereby provides for the detection of the peak temperature or gelation point of resin in the panel, and allows its specific location in the oven to be controlled to optimize the performance and efficiency of the panel production line. In further embodiments, a plurality of pyrometers are spaced apart along the direction of panel movement to provide a temperature profile that accurately indicates the resin gelation point, and panel line speed or oven temperature can be adjusted accordingly. Exemplary methods are also included.

20 Claims, 1 Drawing Sheet

HIGH ACCURACY CONTROL SYSTEM AND METHOD FOR PANEL LINE PRODUCTION

FIELD OF THE INVENTION

The present invention relates to composite members and methods of manufacturing, and more articularly to a highly accurate automated system for manufacturing fiberglass reinforced plastic panels.

BACKGROUND OF THE INVENTION

Methods for making fiberglass reinforced plastic (FRP) panels are taught in U.S. Pat. Nos. 4,329,194; 4,504,343; and 4,568,593, which are incorporated herein by reference.

According to the '343 patent, for example, a composite laminate can be formed by applying resin between layers of backing webs and webs of transverse unidirectional filaments. The laminate is fabricated by pulling fiberglass webs off rollers in a continuous sheet, which is wetted with resin. This mixture is trapped between two plastic films that allow the material to be handled. Once trapped between the two films the material is drawn into a massive oven, which may exceed 50 feet or more, where it is shaped and cured to produce the finished composite member. The large oven permits the panel line to be moved continuously past the heating units. Near the entrance of the oven, molds or shapers, such as shown in FIG. 2 of the '194 patent, bend the laminate into a corrugated shape. The cured panel exits the oven, where the two plastic films are removed, then the panel is advanced by tractor units to a saw, where the panels are cut into desired lengths.

The assessment of the state of resin cure in corrugated fiberglass panels has been typically manually controlled. The speed of the line is critical because it determines how much heat is added to the panel to promote the cure. The manual control of the speed requires constant vigilence by an experienced and diligent operator who must examine and feel the moving panel through various openings along the length of the oven to assess the state of cure. Moreover, the panel must cure in a specific spot in the oven: if the resin-wetted laminate is too soft, it gets snagged, torn, and/or mutilated at any number of stages; if the laminate is prematurely hardened, the desired shape is not obtained. Errors generate costly scrap material.

U.S. Pat. Nos. 3,722,462; 3,762,896; 3,845,287; and 3,989,934 disclose automated continuous line production apparatuses for controlling oven temperature and/or the extent to which fibers or webs that move through the oven are impregnated or coated.

In view of the foregoing disadvantages of the prior art, what is needed is a highly accurate system and method for controlling FRP panel line production.

SUMMARY OF THE INVENTION

The present invention system and method for automating the continuous line production of FRP panels and other FRP substrates. Resins require a certain amount of heat or energy to initiate the hardening or curing process. The temperature and physical characteristics of resins are typically linked in that resin is a liquid at the commencement of heating. Resin then becomes a gel as an exothermic curing process is initiated and the panel attains a peak temperature. Finally, the resin hardens with a slight drop from the peak temperature, and the panel can thereafter be safely gripped by tractor units and pulled through the oven. The invention employs at least one sensor, such as an infrared pyrometer, to locate the resin gelation point within the oven curing zone and thereby to permit the speed of the production line to be adjusted. In a further exemplary embodiment, a plurality of sensors spaced apart longitudinally within the curing zone are connected to a closed loop comparator circuit whereby the panel line speed or oven heating panels are adjusted to control precise location of the gelation point within the curing zone. Consequently, the invention provides greater accuracy and control over panel line production. It also increases speed and efficiency thereof, and attains greater consistency in panel shaping while reducing waste, production errors, downtime, and cost.

DESCRIPTION OF THE DRAWINGS

The advantages and features of the invention will be more readily understood when the following detailed description is considered in conjunction with the drawing, wherein.

DETAILED DESCRIPTION OF THE INVENTION

Figure 1:
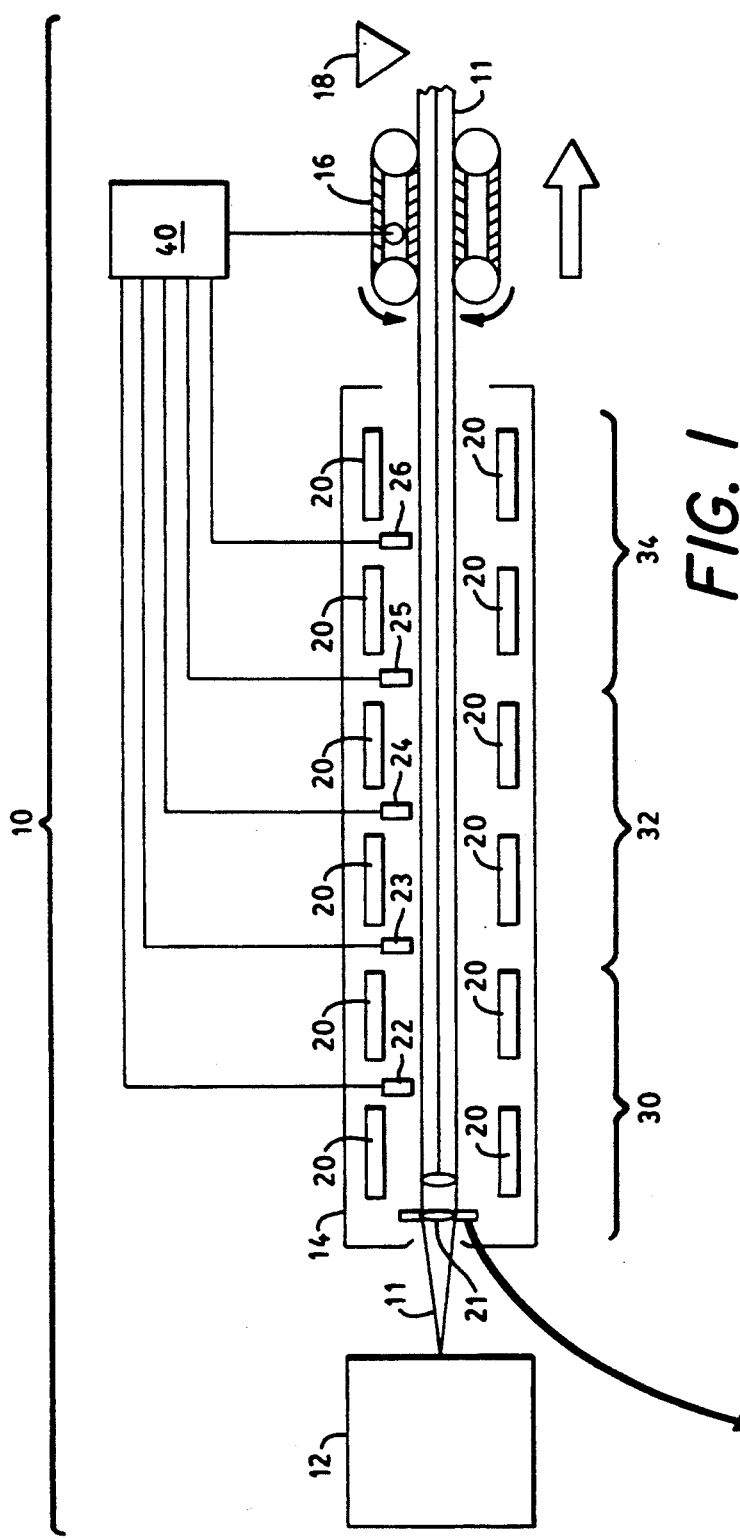
FIG. 1 is a schematic diagram of an exemplary panel line production control system of the invention.

The invention provides for the automated production of fiberglass reinforced plastic (FRP articles such as sheets, panels, corrugated panels, and other shapes which are formed or cut from a continuous length. As shown in FIG. 1, an exemplary automated panel line production system 10 of the invention generally comprises a lay-up area 12, an oven 14, and a roller or tractor assembly 16 for advancing the assembled and cured panel 11 through the lay-up area and oven. A saw 18 or other sectioning device cuts the panel into the desired lengths.

Examples of preferred lay-up areas 12 and lay-up methods are disclosed in U.S. Pat. Nos. 4,329,194; 4,504,343; and 4,568,593 which are incorporated herein by reference. The lay-up areas and methods described in the latter two patents are especially preferred for their use of transverse unidirectional filaments which sandwich a layer of unidirectional filaments that are parallel with the direction of panel corrugations. The fiberglass material is pulled off of spools and wetted or impregnated with resin which is continually pumped onto the fiberglass web or sheet. Any polymerizeable resin which requires heat or energy for initiating the curing process can be used. Resins commonly employed, for example, include vinyl esters, polyesters, acrylics, urethanes, and phenolics. The fiberglass/resin mixture is pressed by rollers between two plastic sheets or films for handling, and pulled through the oven 14 where it is shaped and cured.

It is understood that while shaping is not necessary to the control system and method of the invention, the corrugation of panels is preferred because the strength and dimensional stability of the final product are thereby improved.

An exemplary oven 14 of the invention comprises one or more oven units conformed to permit the panel 11 to be pulled across a number of heaters 20 enclosed by the oven. FIG. 1 is only illustrative of an exemplary oven, and does not depict its scale or the actual number of heaters to be employed. The oven 14 may comprise several oven units in an end-to-end configuration, and any desired number of heaters 20 may be used depending upon the output characteristics and capability of individual units. The heaters 20 are preferably disposed both above and below the moving panel 11 to heat the panel evenly. The heaters 20 are preferably high watt density panel heaters, such as those available from Process Thermal Dynamics, Inc. of Minnesota under the tradename PROTHERM TM CV. These are highly efficient infrared heaters, capable of emitting long to medium infrared wavelengths and able to operate comfortably within a preferred 200-300 degrees Fahrenheit range. However, these are rated to withstand face temperatures of 1600 degrees Fahrenheit. Operation of the infrared heaters at less than their rated optimal output and capacity prolongs the operational life of the heaters and is believed to minimize heating unit failure.

An exemplary oven 14 further comprises at least one sensor 24 for measuring panel temperature. The sensor 20 is preferably an infrared pyrometer operative to measure actual panel temperature from a distance of twelve to eighteen inches from the panel surface. It has a current output proportional to the temperature detected. Such infrared pyrometers are available from Omega Engineering of Stamford, Connecticut, in the OS1200 Series. These models cover a wide range of temperatures, are available with narrow or wide focal angles, and may be used with accessories such as water-cooled shells. The sensor is selected depending upon mounting location and distance from the panel.

An infrared sensor 24 is preferably mounted at a critical point 32, the gelation point, in the curing process. At a first stage 30 of curing, the resin is a liquid; at this stage the panel 11 is pliable and shaped easily. At a second stage 32, the panel is less pliable as gelation begins. Gelation is an exothermic reaction and is detected as a peak temperature. By the third stage 34 of curing, temperature drops slightly as the panel hardens. The panel can then be rolled or pulled out of the oven 14 such as by a tractor unit 16 or other known device. The peak panel temperature corresponding to the gelation of the resin can be ascertained or predetermined such as by measuring the temperature of the panel moving at a known speed along various points in the oven 14 using the sensor 24. Other types of cure-initiating devices 20 and sensors 24 may be used within contemplation of the invention. The oven 14 may also include microwave units, ultraviolet lamps, electron radiators, radioactive isotope radiators, or other such devices. The sensors 24 may include contact devices such as thermocouples as well as non-contact devices which operate in the ultrasonic, x-ray, or other ranges.

It is desirable to keep the gelation point in a specific spot within the oven. If the location of the gelation point is ascertained, then the locations of the liquid precured section of the panel as well as the hardened cured section can be known and can be controlled. If shapers 11 are used, consistency in the profile or corrugated shape of the panel 11 is increased because it will be easier to maintain the pre-cured Pliable section of the panel with respect to the shapers, which may be located throughout and in curing zone 30 as well as in a portion of curing zone 32. Knowing that the gelation point is in the middle of the oven, for example, should make it easier to ensure that the panel 11 is sufficiently hardened by the time it leaves the oven so that its shape or surface is not deformed or destroyed by the tractor unit 16.

Furthermore, when the panel 11 exits the oven 14, and the plastic films used in the lay-up process are peeled from the panel 11, the peeling or removal process will not tend to destroy an insufficiently cured panel or its surface.

In a further exemplary embodiment, two or more sensors 22 and 24 are disposed at different points within the curing zone to detect changes in panel temperature. A sensor can thus be located on either side of the desired gelation point location; the line speed can be increased, for example, when the first sensor output is higher than the other sensor; and the line speed can be decreased when the second sensor is higher than the first sensor. Preferably, at least three sensors, such as designated at 22, 24, and 26, are deployed at spaced intervals. The sensors can be used to measure the panel temperature corresponding to the three respective stages 30, 32, and 34 of resin cure. A rough idea of the temperature profile can thereby be obtained. More preferably, a plurality of sensors 22, 23, 24, 25, and 26, are spaced apart in the curing zone to provide a clearer temperature profile of the panel 11 and, hence, a more accurate indication of the position of the gelation point. Sensors can be spaced more closely together in the vicinity of the desired gelation point location for even greater accuracy.

Line speed is preferably seven to eighteen feet per minute. The gelation state 32 may be relatively small in comparison to the other states 30 and 34. Accordingly, it is highly preferable to use upwards of five to ten sensors or more to identify the gelation point or zone 32 on the panel.

In one exemplary system of the invention, the sensors may be connected to meters or gauges and their individual outputs correlated to panel temperature. The speed of the tractor unit 16 or the output of any of the heaters 20 can be adjusted manually by the operator of the system in accordance with the sensor readings without requiring constant manual checking of the panel line. In a further exemplary system of the invention, the sensors are electrically connected to a closed loop comparator circuit 40 programmed to adjust the speed of the tractor unit 16. For example, if a particular output of a sensor is high, the comparator 40 would be programmed to increase the speed of the tractor unit 16 so that the panel moves more quickly through the curing zone. If the sensor output is low, conversely, the comparator would decrease the line speed.

The cure-initiating devices or heater 20 may be connected to the comparator 40 so that both line speed and individual heating units can be monitored, controlled, and adjusted in further exemplary embodiments of the invention. The aforementioned PROTHERM TM infrared heating panels available from Process Thermal Dynamics, Inc., may have thermocouples installed which are believed to be used in conjunction with such a system for individual regulation of heating units.

Figure 2:
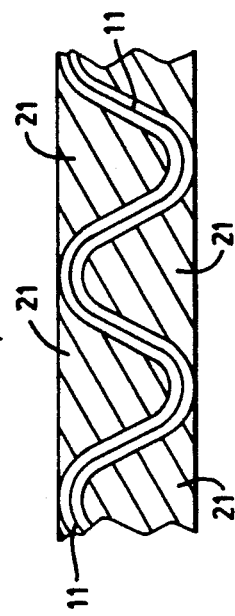
FIG. 2 is an illustration of panel shapers along the direction of panel travel as shown in FIG. 1.

FIG. 2 is an illustration of a shaper 21. Almost any known shaper devices or methods can be used without affecting the operation of the machine control system of the invention.

It is helpful to note that a series of shapers may be used in the curing zones 30 and 32 within the oven. The ability of the invention to provide control over state of cure at a particular point within the oven increases control over the shaping of the panel profile.

In accordance with the foregoing exemplary control systems, the method of the invention involves the preferred steps of detecting the gelation or peak temperature of the moving panel and adjusting the speed of the production line to maintain the gelation point at a specific location within the oven. Alternatively or in conjunction with these steps, the heater temperatures can also be adjusted. In further exemplary methods of the invention, the temperature of the moving panel is detected at two or more points in the moving panel using more than one sensor to detect temperature changes. A plurality of sensors is preferably used to obtain a temperature profile which provides an accurate indication of the gelation point, and the speed of the tractor unit 16 and/or output of the infrared heating panels 20 is increased or decreased accordingly.

It is expected that most thermoset resins are exothermic and will display a "peak" temperature which then decreases during solidification or hardening of the panel. It may also be the case that the peak temperature may not precisely correspond with the location of the gel zone in the resin in that panel temperature may continue to rise even though solidification is underway. This may occur where a mixture of resins having different gelation points are used. The invention may be adopted for such circumstances, and indeed for situations where the "peak" temperature rises above the "peak" temperature which corresponds with the onset of gelation, by performing test runs to ascertain the minimum panel temperature for a certain spot within the oven curing zone.

The foregoing embodiments and methods and the accompanying drawings are provided for illustration only. As variations or modifications of these examples are possible, the scope of the invention is intended to be limited only by the following claims.

What is claimed:

1. A system for controlling the location of an FRP resin gelation zone in a continuous line production, comprising:
   means for moving the resin-wetted substrate through said oven;
   at least three sensors located within said oven, said at least three sensors being spaced apart from each other along the direction of substrate movement through said oven, one of said sensors located and thereby operative to provide an output corresponding to temperature of the resin-impregnated substrate prior to resin gelation, and another of said sensors located and thereby operative to provide an output corresponding to temperature of the resin-impregnated substrate after resin gelation whereby the location of the gelation zone of the resin with respect to the location of said sensors is detected; and
   means for adjusting said moving means whereby the location in said oven of the resin gelation zone can be controlled.

2. The system of claim 1 wherein one of the temperatures detected by the sensors corresponds to the peak temperature of the resin.

3. The system of claim 1 wherein said heater comprises an infrared heater.

4. The system of claim 1 wherein said sensors comprise infrared pyrometers.

5. The system of claim 4 wherein said infrared pyrometers have a predetermined focus.

6. The system of claim 1 wherein said adjusting means comprises a comparator circuit whereby the speed of the substrate moving means is altered in response to an output of said sensors.

7. The system of claim 1 wherein said adjusting means comprises a comparator circuit whereby the speed of said moving means is increased when the output of one of said sensors is greater than another sensor.

8. The system of claim 1 wherein said moving means comprises a tractor device.

9. The system of claim 1 further comprising shapers operative to shape a resin-wetted substrate within said oven at a point prior to hardening of the resin.

10. The system of claim 1 including means to form the substrate into a panel.

11. A method for controlling the location of an FRP resin gelation zone in a continuous line production, comprising the steps of:
    moving a resin-wetted fiberglass substrate through a curing oven having at least one heater operative to initiate curing of the resin-wetted substrate;
    detecting temperatures of the resin-wetted fiberglass substrate in at least three spaced-apart locations within the curing oven by providing at least three sensors along the direction of substrate movement within said oven, one of said sensors located and thereby operative to detect the temperature of the resin before gelation, and another of said sensors located and thereby operative to detect the temperature of the resin after gelation; and
    adjusting the speed at which the substrate moves through the oven to maintain the location of the resin gelation zone at a specific place within the oven.

12. The method of claim 11 wherein in said detecting step, one of said at least three sensors is located and thereby operative to detect the temperature corresponding to the peak temperature of the resin.

13. The method of claim 11 wherein the detecting step further comprises using at least one infrared pyrometer.

14. The method of claim 11 further comprising the step of using at least one infrared pyrometer operative to detect the gelation point of a substrate moving in the oven, and providing a closed-loop comparator circuit whereby the speed of the substrate movement is adjusted in response to output from said pyrometer.

15. The method of claim 11 wherein the substrate is formed into a panel.

16. The method of claim 11 further comprising a comparator circuit operative to increase the speed of substrate movement when the output of one of said sensors is greater than the output of another of said sensors.

17. The system of claim 1 further comprising additional sensors spaced apart from the other of said sensors within said oven.

18. The system of claim 17 wherein the sensors are infrared pyrometers.

19. The method of claim 11 further comprising the step of providing additional sensors spaced apart from the other said sensors within said oven.

20. The method of claim 19 wherein, in said step of providing sensors, the sensors are infrared pyrometers.

* * * * *

UNITED STATES PATENT AND TRADEMARK OFFICE
CERTIFICATE OF CORRECTION

PATENT NO. : 5,209,881
DATED : May 11, 1993
INVENTOR(S) : Derrick Charbonnet

It is certified that error appears in the above-indentified patent and that said Letters Patent is hereby corrected as shown below:

Column 2, line 31, "(FRP" should read --(FRP)--.
Column 5, after line 38, insert the following:

an oven conformed to allow a substrate comprised of
    resin-wetted fiberglass to be moved continuously therethrough, said
    oven comprising at least one heater operative to initiate curing of the
    resin-wetted substrate;

Signed and Sealed this

First Day of February, 1994

*Attest:*

BRUCE LEHMAN

*Attesting Officer*      *Commissioner of Patents and Trademarks*